Aug. 15, 1967  T. J. SCARPA  3,336,485
TRANSISTOR TRACKING SYSTEMS
Filed June 16, 1964  2 Sheets-Sheet 2

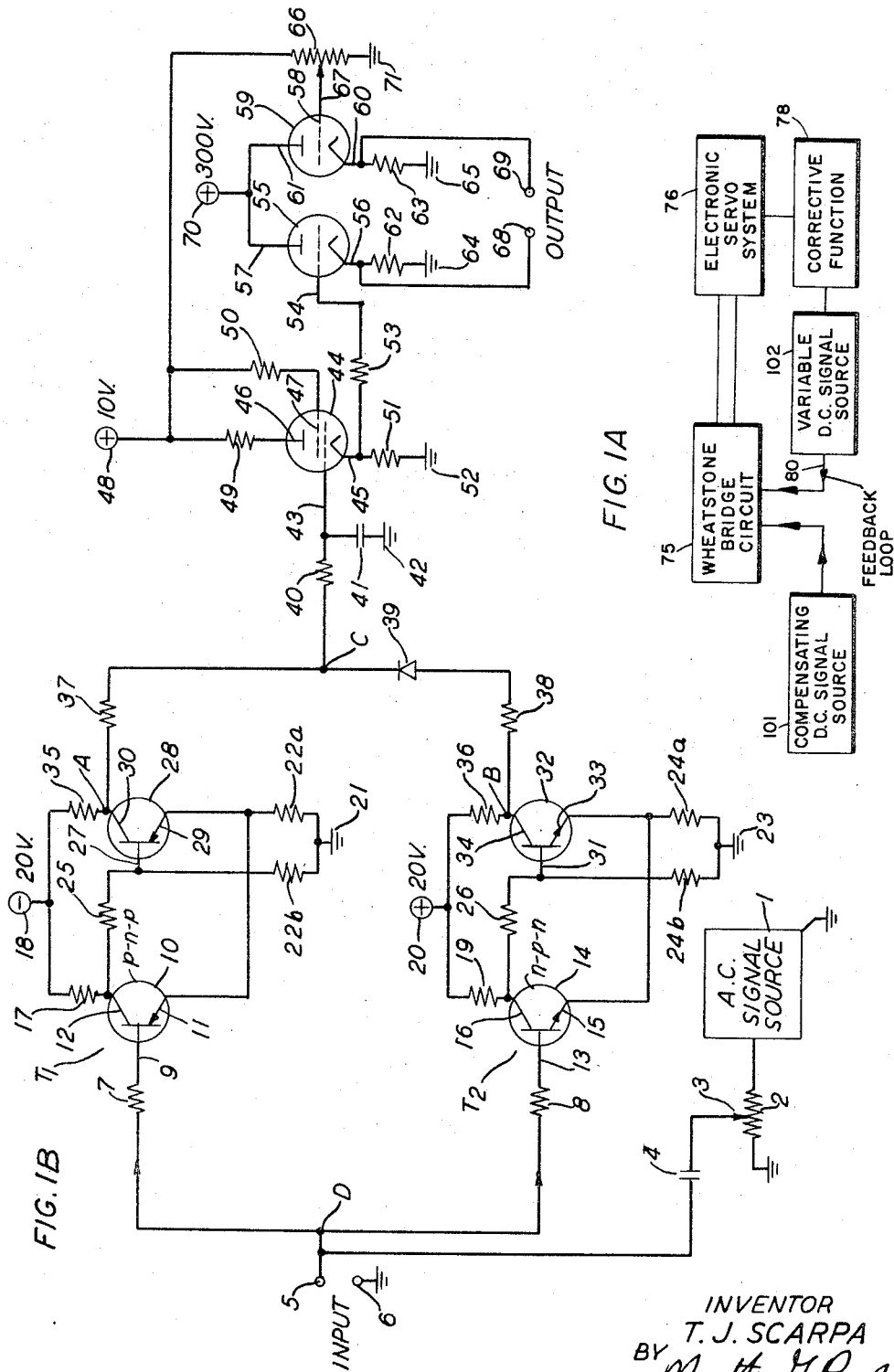

INVENTOR
T. J. SCARPA
BY
Martha H. Pugh
ATTORNEY

United States Patent Office 3,336,485
Patented Aug. 15, 1967

3,336,485
TRANSISTOR TRACKING SYSTEMS
Thomas J. Scarpa, Metuchen, N.J., assignor, by mesne assignments, to Edison Instruments, Inc.
Filed June 16, 1964, Ser. No. 375,501
5 Claims. (Cl. 307—88.5)

This invention relates in general to electronic tracking systems of a type known in the art; and more particularly, to transistor tracking and servo systems such as may be employed in a thermistor flowmeter disclosed in my application Ser. No. 375,537, filed at even date herewith.

Most tracking and servo systems have the disadvantage of overreacting to an unbalance or error signal, so that they are constantly in operation, making gross corrections notwithstanding the size of the error signal, which leads to hunting back and forth around the balance point without achieving a condition of actual balance. Moreover, in many error correcting systems which employ motors or other mechanical parts, there is a substantial time lag between detection of an error signal and generation of an appropriate corrective signal which is quite inflexible to adjustment, thereby making precise compensation of the error practically impossible.

Accordingly, it is the primary object of this invention to provide an improved type of tracking and servo system. A more particular object of the invention is to provide a tracking and servo system having a rate of reaction to a given error signal which is a function of the size of the error. A further object of the invention is to provide a tracking and servo system without moving mechanical parts wherein the phase delay may either be substantially eliminated or readily adjusted in accordance with system requirements.

These and other objects are realized in an electronic tracking and servo system designed in accordance with the present invention which employs a matched pair of trigger circuits, each comprising transistors of opposite conductivity type to the other. The two trigger circuits are symmetrically connected about the high potential input terminal of the system, and also, about an output junction, at which summing point the oppositely phased outputs are algebraically added and their sum utilized to charge or discharge a capacitor connected to the summing point. The rise and fall of the capacitor charge is sensed without appreciable discharge by an electronic sensing device, and compared with a preselected reference value to produce a difference signal which is of a magnitude and polarity to correct any condition of unbalance across the input terminals, which might result, for example, from unbalance of a Wheatstone bridge, a temperature bridge, or a strain guage bridge.

An alternating current signal source is connected to the input terminals of the servo system to impress thereacross a uniform frequency alternating current, the positive and negative components of which are balanced with respect to ground.

A particular feature of the present invention is the operation of the trigger circuits in response to a condition of balance, or different degrees of unbalance across the input terminals of the system.

In the first case, wherein no direct current bias is imposed at the input terminals, the peak alternating voltages cause the opposing trigger circuits to trigger in alternation during positive and negative cycles to relatively increased output potentials. Since the alternating current is balanced with respect to ground, the positive and negative output potentials have equal dwell times. This results in two series of pulses at the junction point which are equal in magnitude and opposite in polarity, producing, in aggregate, no change in charge across the connected capacitor, and hence, no corrective output voltage across the servo output terminals.

In the second case, wherein a slight direct current bias is imposed across the servo system input terminals, both trigger circuits are still triggered in alternation during the positive and negative cycles, but for unequal dwell times, producing two unequal series of positive and negative pulses at the junction, the aggregate of which is slightly positive or slightly negative, producing a slow rate of charge or discharge on the connected capacitor, depending on whether the bias signal is positive or negative.

In the third case, wherein a gross direct current bias is applied across the servo input terminals, one trigger circuit is continuously triggered to the exclusion of the other, producing a steady voltage of one polarity at the summing point. This causes a rapid variation in charge on the capacitor in a direction which depends on the polarity of the bias applied across the servo input terminals.

It will be apparent that such a tracking and servo system has a number of advantages over those now known in the art. In the first place, the rate of correction depends on whether the error signal is large or small, being rapid in the former case, and slowing to a refined operation in the latter case. This type of operation prevents overcorrection and hunting; and, provides for a precise condition of balance with a minimum expenditure of power. Moreover, substitution in the circuit of the present invention of a capacitor, an electronic component, for a mechanical component, such as a motor driven potentiometer usually employed in the prior art, makes circuit operation much more flexible. For example, the time lag of the circuit can be substantially reduced, or, in fact, varied to meet any special requirements by merely changing the time constant on the charging circuit, a substantially simpler process than changing gear ratios in a mechanical component.

These and additional objects, features, and advantages will be apparent to those skilled in the art from a study of the specification and claims hereinafter with reference to the attached drawings, in which:

FIGURE 1A is a generalized block diagram of a circuit including a feedback loop for balancing out error signals in a tracking and servo system in accordance with the present invention;

FIGURE 1B is a schematic circuit diagram of a preferred embodiment of the electric servo system employed in accordance with the present invention;

Figure 4:
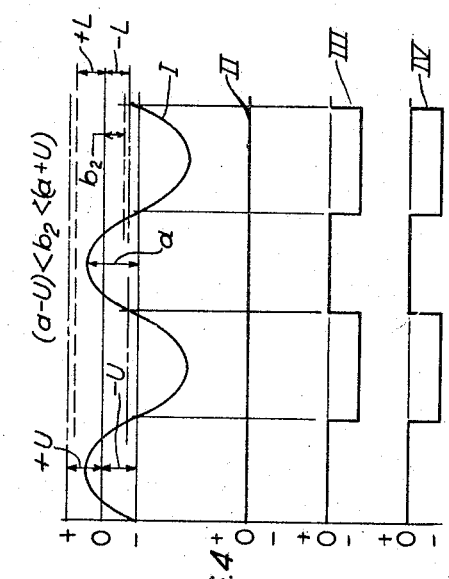
Figure 5:
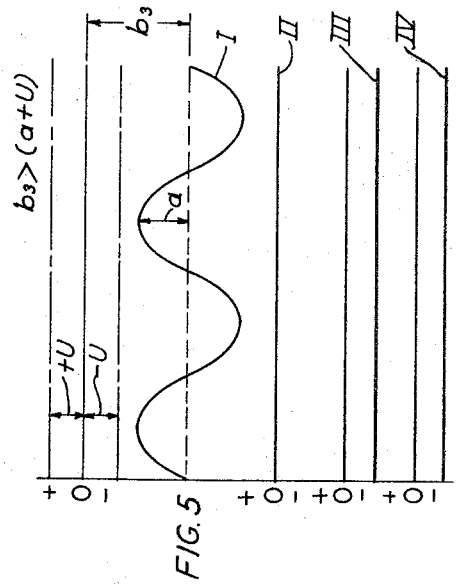

FIGURE 4 is a graphical showing of input voltage to the servo system of the present invention which has a negative bias transitional between slight and gross, and the resultant output voltages at points B, A, and C; and FIGURE 5 is a graphical showing of input voltage to the servo system of the present invention which has a gross negative bias, and the resultant output voltages at points B, A, and C.

Referring to FIGURE 1A of the drawings, there is shown in generalized block diagram a system of a type described specifically in my application Ser. No. 375,537, filed at even date herewith, which relates to double thermistor flowmeters. It will be apparent to those skilled in the art that the tracking and servo system described, for example, with reference to FIGURES 1 and 2 of that application, is not restricted to use in flowmeters, but has general application to any circuit in which it is desired to continuously compensate or correct for a condition of unbalance arising when an input signal tends to fluctuate above and below as preselected zero point. Hence, the tracking and servo system specifically disclosed therein, is set forth in this specification in a more generalized setting to emphasize its broad application.

In FIGURE 1A, the signal source 102 may represent any direct current source which fluctuates above and below a preselceted zero point, such as, for specific example, the thermistor 102 in FIGURE 1 of applicant's copending application Ser. No. 375,537, which is exposed to the moving stream in the flowmeter. The signal from source 102 is impressed across one arm of a conventional bridge circuit 75, such as the bridge circuit of FIGURES 1 and 2 of applicant's copending application, supra. A signal from compensating direct current source 101, is impressed across a second arm of the bridge circuit 75, adjacent to the first arm, so that effects of ambient variations in temperature and pressure are compensated for and cancelled out in the variable direct current signal impressed between the two opposite bridge terminals adjacent the ground terminal.

These two opposite terminals are also connected, in a manner balanced with respect to ground, to the oppositely poled base circuits of transistors 10 and 14.

The specifications for the electronic servo system 76 will be described in detail with reference to FIGURE 2 hereinafter.

The output from the electronic servo system 76 is connected either directly or through feedback loop 80, which includes a source of corrective function 78, to correct for variations in the amplitude of signal source 102, thereby maintaining the bridge circuit in a condition of balance. As disclosed in my copending application Ser. No. 375,537, the source of corrective function 78 takes the form of a heater circuit, which supplies heat to the thermistor 102 to compensate for the heat lost to fluid flowing in the flowmeter. It will be appreciated by those skilled in the art that the sources 101 and 102 and the source of corrective function 78 can take other forms than those shown herein, or in my copending application Ser. No. 375,537.

Referring to FIGURE 1B of the drawings, which is a detailed schematic showing of one embodiment of the electronic servo system of the present invention, an alternating current milliwatt signal source 1 having a frequency of, say, 60 cycles per second, is applied across a 100,000 ohm potential divider 2 connected to ground. The slider 3 is connected through the 0.1 microfarad capacitor 4 between the high potential terminal 5 and ground 6; and, in the present embodiment is adjusted to apply thereto an alternating current voltage of, say, one volt root mean square.

A pair of 1500 ohm resistors 7 and 8 are respectively connected between the junction D and the base electrodes 9 and 13 of a pair of oppositely poled junction transistors 10 and 14, 10 of p-n-p type and 14 of n-p-n type, respectively. The latter may be of any of the types well-known in the art. For example, the oppositely poled pair may be selected from the transistors indicated in the table which follows.

TABLE

| No. | Manufacturer | Type | Emitter-Base Impedance, ohms | Emitter-Base Saturation Voltage | |
|---|---|---|---|---|---|
| | | | | Minimum | Maximum |
| 2N1303 | General Electric Company | p-n-p | 320 | 0.15 | 0.4 |
| 2N1304 | do | n-p-n | 320 | 0.15 | 0.4 |
| 2N1305 | Radio Corporation of America | p-n-p | 450 | 0.15 | .35 |
| 2N1306 | do | n-p-n | 450 | 0.15 | .35 |
| 2N1307 | do | p-n-p | 480 | 0.15 | .35 |
| 2N1308 | do | n-p-n | 480 | 0.15 | .35 |

The p-n-p transistor 10 has an emitter 11 and a collector 12, the latter being energized from the 20 volt negative source 18 through the 1500 ohm resistor 17. Similarly, the n-p-n transistor 14 has an emitter 15 and a collector 16, the latter of which is energized from the 20 volt positive source 20 through a 1500 ohm resistor 19. The emitter 11 is connected to ground 21 across the 220 ohm resistor 22a; and, the emitter 15 is connected to ground 22 across the 220 ohm resistor 24a. The collector 12 is connected through the 6800 ohm resistor 25 to the base 27 of transistor 28, the latter electrode being connected to ground 21 through the 8200 ohm resistor 22b. The collector 16 in transistor 14 is similarly connected through the 6800 ohm resistor 26 to the base electrode 31 of transistor 32, the latter electrode being connected to ground through the 8200 ohm resistor 24b.

Transistor 28, of p-n-p type, includes an emitter 29 and collector 30, the latter being energized from the negative 20 volt source 18 through the 1000 ohm resistor 35. Emitter 29 is connected to a junction with emitter 11 and to ground 21 through the resistor 22a.

Transistor 32, of n-p-n type, includes an emitter 33 and collector 34, the latter being energized from the 20 volt positive source 20 through 1000 ohm resistor 36. Emitter 33 is connected to the junction with emitter 15 and to ground 23 through the resistor 24a.

Transistors 28 and 32 may be selected, for example, from two opposite conductivity junction transistor types disclosed in the table hereinbefore.

The collector 30 of the transistor 28 and the collector 34 of the transistor 32 are connected to the summing point C through the 3.3 megohm resistors 37 and 38, respectively. Summing point C is connected in series with the 47 megohm resistor 40 to the upper terminal of the one microfarad capacitor 41, which is connected to ground 42. It will be understood that the time constant of the resistance-capacitance circuit comprising capacitor 41 and resistor 47 is variable to meet the requirements of each system. A diode 39 is interposed between resistor 38 and summing point C, so that capacitor 41 can charge up without bleeding off its charge. Diode 39 can be of any of the types known in the art which is characterized by a high back resistance.

Capacitor 41 has its high potential terminal connected to the grid 43 of the electrometer tube 44. The latter tube includes a cathode 45, a plate 46, and a screen grid 47. In the embodiment under description, electrometer tube 44 is type 7851, manufactured by Tung Sol Electric Inc. of Bloomfield, N.J. The cathode 45 is heated by means of a filament which draws 200 milliamperes current across a 2.5 volt power source. The important qualification of electrometer tube 44 is that it be designed to draw a very limited grid current, of $10^{-8}$ amperes or less, and preferably $10^{-14}$ amperes or less, whereby it senses, without significant discharge, the voltage across capacitor 41. Alternatively, a field effect transistor, either p-channel or n-channel, can be substituted for the electrometer tube 44.

The plate 46 is energized from the 10 volt positive source 48 through the 1.5 megohm resistor 49; and, the screen grid 47 is energized from the same source through the 10,000 ohm resistor 50. The cathode 45 of tetrode 44 is connected across the one megohm resistor 51 to ground 52. The cathode 45 is connected, in cathode follower connection, through the one megohm resistor 53 to one grid 54 of the triode 55, which is helf of a 12AU7 twin triode manufactured by Tung Sol Electric Inc., the other half being triode 59. The cathodes 56 and 60, respectively, of twin triode 55–59 are heated by a filament which draws a current of 450 milliamperes across a three volt power source.

The plates or anodes 57 and 61, respectively, of triodes 55 and 59 are energized by direct connection to the 300 volt positive source 70. The grid 58 of triode 59 is connected to slider 67 which moves along the 10,000 ohm potential divider 56, the latter being connected between the 10 volt positive source 48 and ground 71. Preferably, the slider 67 is adjusted for the purposes of the present embodiment to impart a direct current reference voltage of desired value to the grid 58.

The output terminals 68 and 69 are respectively connected in cathode follower fashion to the cathodes 56 and 60, each of the latter being connected to ground terminals 64 and 65 through one of the 10,000 ohm resistors 62 and 63, respectively.

It will be recognized by those skilled in the art that each of the oppositely poled, balanced circuits, including transistor pairs 10 and 28, and 14 and 32, is known as a Schmitt trigger, the design and operation of which is described in detail in Transistor Circuit Design by the Engineering Staff of the Texas Instruments Corporation, McGraw-Hill, N.Y., 1963, pages 381–383.

Each of the transistors of pair 10 and 28, forming the Schmitt trigger $T_1$, is a p-n-p type energized from a negative potential source; whereas, each of the transistors of pair 14 and 32, forming the Schmitt trigger $T_2$, is an n-p-n type energized from a positive potential source.

Assume in each case that $\pm V_{E_2}$ is the emitter voltage when transistor 32 or 28, respectively, is conducting; and, $\pm V_{E_1}$ is the emitter voltage when transistor 14 or 10, respectively, is conducting.

Neglecting the currents in base resistors 8 and 7, respectively, $U$ (upper trip point) $= \pm(V_{E_2}+V_{BE_1})$ and
$L$ (lower trip point) $= \pm(V_{E_1}+V_{BE_1})$ where $\pm V_{BE_1}$, respectively, is the potential difference between base and emitter in the input transistor to each trigger, the negative sign being characteristic of trigger $T_1$, and the positive sign being characteristic of trigger $T_2$.

It is common for values of $\pm V_{E_1}$ to be greater than one volt; and, for the differences of the trip points to be of the order of 0.5 volt. The criteria for selecting a given U and L is the degree to which one wishes to exercise refined or gross control in tracking a condition of circuit unbalance.

After selecting values of UTP and LTP, and the energizing potentials $V_{E_1}$ and $V_{E_2}$, for the first and second trigger circuits, the critical resistance values may be calculated in the manner indicated under the paragraph on Trigger Circuits, pages 381–383, Tranisistor Circuit Design, supra.

Operation of trigger circuit $T_1$ is as follows. When no current is flowing into the base 9, transistor 10 is nonconducting and transistor 28 is normally conducting at a saturation potential so that the potential of collector 30 is slightly negative. As soon as the input voltage at point D reaches a negative potential equal to the upper trip voltage $-U$ (which is negative for trigger circuit $T_1$), the transistor 10 begins to conduct, lowering the potential on the collector 12 and raising the potential on the emitters 11 and 29, which are tied together. This reduces the potential on the base 27 of transistor 28, causing the latter to come out of saturation. The decrease in current through collector 30 causes a fall in potential on emitter 29, thereby increasing the current into the base electrode 9 of the transistor 10. This sets up a regenerative condition which continues until transistor 28 ceases to conduct. Because resistor 17 is substantially larger than resistor 35, the potential on emitters 11 and 29 is lower when transistor 10 is conducting than when transistor 28 is conducting, thereby lowering the trip point to $-L$. During this period, the potential on collector 30 is raised to the negative supply potential. When the negative potential impressed on the base electrode 9 falls below $-L$, the lower trip voltage, the operation is reversed and the circuit returns to the initial state with transistor 28 conducting and transistor 10 nonconducting.

Operation of trigger circuit $T_2$ is similar in response to signals of opposite polarity, inasmuch as the circuit parameters in the two trigger circuits are equal. When no current is flowing into the base electrode 13, transistor 14 is nonconducting and transistor 32 is conducting, with collector 34 slightly positive. As soon as the input voltage at point D exceeds the positive upper trip voltage $+U$, transistor 14 begins to conduct, lowering the voltage on collector 16 and raising the voltage on emitters 15 and 33, which are connected together. This will reduce the voltage on base 31 of transistor 32 to the point at which transistor 32 comes out of saturation. The decrease in the current through collector 34 causes the potential on emitter 33 to fall, which increases the current into the base 13 of transistor 14, at which point both transistors are active and the circuit is regenerative, a condition which continues until transistor 14 becomes conducting and transistor 32 becomes nonconducting. As in trigger circuit $T_1$, the resistor 19 is substantially larger than resistor 36. The potential on emitters 15 and 30 is, therefore, lower when transistor 14 is conducting than when transistor 32 is conducting; because of this, the trip point $+L$ is lowered. During this same period, collector 34 is at the positive supply potential. When the positive potential into base 13 falls below the lower trip voltage $+L$, the reverse operation occurs and the circuit returns to its initial state with transistor 32 conducting and transistor 14 nonconducting.

Figure 2:
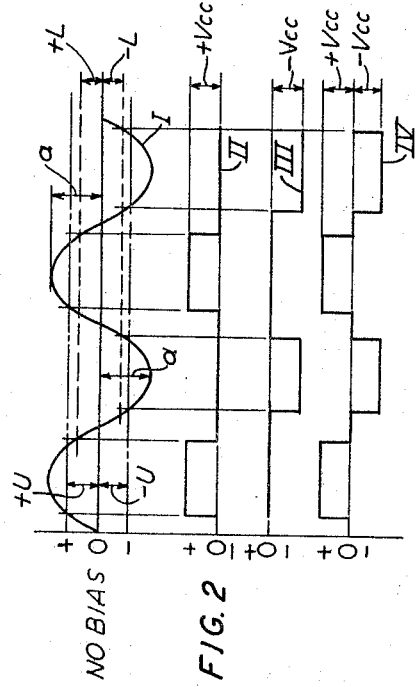
FIGURE 2 is a graphical showing of the balanced alternating current input voltage to the servo system of the present invention, and the resultant output voltages at points B, A, and C.

Assume that alternating current is applied at point D, as indicated in FIGURE 2, curve I, having a maximum amplitude $\pm a$ which should exceed the upper trigger voltage $\pm U$, and is preferably two to three times $\pm U$. In this instance, no direct current bias is applied, as indicated in FIGURE 2, curve I. Trigger circuits $T_1$ and $T_2$ are then triggered in alternation so that transistor 14 remains conducting during the positive half of the alternating current cycle, and the transistor 10 remains conducting during the negative half cycle, with collectors 34 and 30, at points B and A, alternately plus or minus the supply potentials, as indicated in FIGURE 2, curves II and III of the drawings. Thus, the aggregate net potential at point C is zero, as indicated in FIGURE 2, curve IV and the net charge on the capacitor 41 remains unchanged.

Figure 3:
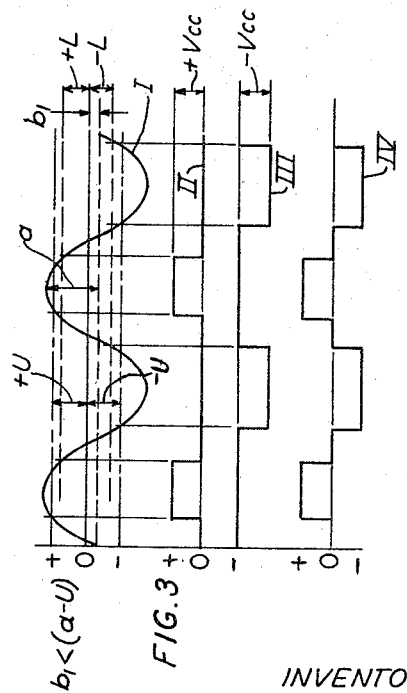
FIGURE 3 is a graphical showing of input voltage to the servo system of the present invention which has a slight negative bias, and the resultant output voltages at points B, A, and C.

Assume that a small negative bias $b_1$ is applied to the alternating current signal imposed on point D by the signal source 1, such that the absolute value of quantity $(a-b_1)$ still exceeds that of U, as shown, for example, in FIGURE 3, curve I of the drawings. In the case indicated, trigger circuit $T_1$ is tripped during the negative half cycle so that transistor 10 is conducting during this period; and trigger circuit $T_2$ is tripped during the positive half cycle so that transistor 14 is conducting during this period. It will be apparent, however, that since the larger part of the cycle is negative, the dwell time during which the transistor 14 is conducting is substantially longer than the dwell time during which transistor 10 is conducting. Thus, as indicated in FIGURE 3, curves II and III of the drawings, points B and A, respectively, are switched on and off with unequal dwell times so that the aggregate potential at point C becomes slightly negative, as indicated in FIGURE 3, curve IV, and the aggregate charge on the capacitor 41 is reduced at a relatively slow rate, depending on the differential between the negative and positive dwell times.

Assume, now, that a larger negative bias, $b_2$, is applied at point D, where, for the absolute values, $$(a-U)<b_2<(a+U)$$

as indicated in curve I of FIGURE 4 of the drawings. In such case, since the peak positive voltage is now less than the upper triggering voltage $+U$, it is insufficient to trip trigger circuit $T_2$. Hence, transistor 28 in trigger circuit $T_2$ remains conducting at saturation; and, the potential on collector 34 at point B is approximately zero, as indicated in curve II of FIGURE 4. Meanwhile, transistor $T_1$ is tripped during the negative half cycles, shifting conduction from transistor 28 to transistor 10, so that collector 30 at point A is raised to the negative supply potential during those alternate intervals, as indicated in FIGURE 4, curve III. Thus, the output at point C is in the form of negative pulses, as indicated in FIGURE 4, curve IV, producing a somewhat more rapid discharge of capacitor 41, than under the previous condition. In actual practice, the condition just described is transitional, and of hardly perceptible duration, between the conditions of slight unbalance $b_1$, previously described, and gross unbalance $b_3$, about to be described.

Assume now that a gross negative bias $b_3$ is applied at point D, where $(a-b_3)$ exceeds in absolute value the upper trigger voltage U, as indicated in FIGURE 5, curve I of the drawings. In such case, the transistor 28 in trigger circuit $T_1$ ceases to conduct, and the transistor 10 becomes continuously conducting. In trigger circuit $T_2$, transistor 32 remains continuously conducting, since the positive cycle peaks are below the positive upper trigger voltage $+U$. In trigger circuit $T_1$, transistor 10 remains conducting until the gross negative bias drops below the lower trip voltage $-L$, at which time the trigger circuits $T_1$ and $T_2$ again return to alternate operation with unequal dwell times until a final balance is achieved. The resultant potentials at points B, A, and C, respectively, are as indicated by curves II, III, and IV of FIGURE 5. The capacitor 41 is discharged at a rapid rate until the gross condition of unbalance is reduced at the input terminals, whereupon the charge on the capacitor 41 is reduced at a less rapid rate, until a condition of balance is achieved.

Assuming that positive, instead of negative, biases were to be applied across the input terminals at the point D, the operations of the trigger circuits $T_2$ and $T_1$ would be exactly reversed, producing voltages of polarities opposite to those described at points A, B, and C, with reference to FIGURES 2, 3, 4, and 5 of the drawings.

Assuming, for example, that the capacitor 41 is charged up to a predetermined charge, and the aggregate voltage at point C is negative, capacitor 41 is discharged at a rate depending on the degree of circuit unbalance. This change in negative potential is impressed on the grid 43 of the tetrode 44. The cathode voltage across the resistor 51 is correspondingly varied in cathode follower fashion, and is in turn applied to the grid 54 of the twin triode 55–59, from which it is amplified and applied to output terminal 68 connected across the cathode resistor 62. Here, it is compared, at opposite terminal 69, with a reference voltage from potential divider 66 applied through slider 67 to grid 58 of the triode 59. Thus, the output voltage across terminals 68 and 69 will vary slowly or rapidly in such a direction as to minimize and bring to an approximate condition of zero balance, any condition of unbalance appearing across the input terminals 5 and 6 at point D.

It will be apparent to those skilled in the art that the servo system described in detail herein is designed for use in many different types of tracking and error feedback systems. Moreover, the present invention has particular utility, for example, in a thermistor flowmeter system of the type disclosed in my application Ser. No. 375,537, filed on June 16, 1964.

The present invention is not limited to the specific embodiment described herein by way of illustration, or any of the specific components shown and described. Rather, the scope of the invention is to be construed as defined in the claims hereinafter.

What I claims is:

1. A transistor tracking and servo system comprising in combination two trigger circuits each comprising a pair of transistors of opposite conductivity type to the other trigger circuit of said pair, said trigger circuits connected at their high potential input terminals to a junction, two sources of substantially equal potential and opposite polarity, said sources respectively connected to each of said trigger circuits to energize the transistors thereof to conduct in a forward direction, one of the transistors in each said trigger circuit connected to be normally conducting at a low saturation voltage in response to input signals below a preselected reference value in the polarity of its energizing source, the other said transistor in each said trigger circuit connected to be triggered to conduct at a substantially higher level of current conduction than that of said one transistor in response to input signals above said preselected value in the polarity of its energizing source, said trigger circuits connected at their output terminals to a summing point for summing the outputs of said trigger circuits, a source of direct current signal which varies in amplitude as a function of time connected to said junction at the input terminals of said trigger circuits, an alternating current signal source connected to said junction at the input terminals to said trigger circuits, for impressing on said junction, superposed on said direct current signal, a balanced alternating current signal voltage of substantially uniform period and amplitude having peak values exceeding said preselected value, a charge storing circuit connected to said summing point and constructed and arranged to be charged or discharged in response to the amplitude and polarity of the sum of the output signals from said trigger circuits, sensing means connected to said charge storing circuit for sensing the voltage thereacross without substantially discharging said charge storing circuit, and means connected to said sensing means for constantly comparing the aggregate potential across said charge storing circuit with a selected potential, to produce a voltage output of said comparing means which is a function of the amplitude of the direct current potential across said input terminals and of opposite polarity thereto, said output voltage being relatively large when the amplitude of said direct current signal exceeds a preselected value, and substantially smaller when said amplitude is less than said preselected value.

2. A transistor tracking and servo system comprising in combination a pair of terminals including a high potential terminal and a ground terminal, a source of a direct current error signal which may vary in amplitude as a function of time connected across said terminals, a source of alternating current of substantially uniform period and amplitude connected across said terminals and superposed on said current error signal, a pair of trigger circuits, each of said trigger circuits comprising a first and second transistor of opposite conductivity type from the first and second transistors in the other trigger circuit of said pair, each of the transistors in said trigger circuits having emitter, base, and collector electrodes, the base electrodes of the first said transistors of each of said trigger circuits connected together to said high potential terminal, a pair of equal potential energizing sources of opposite polarity, a matching pair of resistors in each of said trigger circuits, one of the resistors of said pair being substantially larger than the other resistor of said pair, the collector electrodes of said first transistors in each of said trigger circuits connected through the larger resistor of said pair to an appropriate one of said energizing sources to energize said first transistors to conduct in a forward direction of conduction, one in a positive direction and the other in a negative direction, the collector electrodes of said second transistors in each of said trigger circuits connected through the smaller resistor of said pair to an appropriate one of said energizing sources to energize said second transistors to conduct in a forward direction of conduction, one in a positive direction and the other in a negative direction, the collector electrodes of said first transistors connected to the base of the second said transistor in each said trigger circuit, the emitters of said first and second transistors connected together to a point of common potential in each of said trigger circuits, matching resistors respectively connected to each of the collector electrodes in the second transistor in each said trigger circuits, each of said matching resistors respectively connected to a common summing point, a charge storing circuit connected across said summing point to ground, sensing means connected to sense the potential across said charge storing circuit without substantially discharging said circuit, a comparator circuit connected to receive the output voltage from said sensing means for comparing the change in potential across said charge storing circuit with a selected potential, and output terminals connected across said comparator circuit for receiving from said comparator circuit an output voltage which is substantially proportional to but of inverse polarity to said direct current error signal.

3. The combination in accordance with claim 2, wherein a diode is connected in a forward direction of conduction in the circuit between the collector of the second transistor of said negatively energized trigger circuit and said summing point for preventing the charge from bleeding off of said charge storing circuit.

4. The combination in accordance with claim 2, wherein said charge storing circuit comprises a capacitor, and said means to sense the potential across said charge storing circuit comprises an electrometer circuit.

5. The combination in accordance with claim 2, wherein said comparator circuit comprises a pair of balanced electron discharge devices, each one of said pair having an anode, a cathode, and a control electrode, the control electrode in the first one of said pair of electron discharge devices connected to said sensing means to receive an output signal proportionate to the variations in charge on said charge storing circuit, a source of selected potential, the control electrode of the second one of said pair of electron discharge devices connected to said source of selected potential, a pair of cathode resistors respectively connected to the cathodes in each of said electron discharge devices, and output terminals respectively connected across said cathode resistors.

References Cited
UNITED STATES PATENTS

| | | | |
|---|---|---|---|
| 3,135,918 | 6/1964 | Bergson | 328—148 X |
| 3,196,292 | 7/1965 | McCutcheon | 307—88.5 |
| 3,209,268 | 9/1965 | Fraunfelder et al. | 328—150 X |

OTHER REFERENCES

Skilling: New Complementary Transistors Make Series Schmitt Circuits Practical, Electronics Magazine, Aug. 31, 1962, page 52 relied on.

ARTHUR GAUSS, *Primary Examiner.*

I. C. EDELL, B. P. DAVIS, *Assistant Examiners.*